United States Patent
Chen et al.

(10) Patent No.: US 10,284,014 B2
(45) Date of Patent: May 7, 2019

(54) TRANSCEIVING WIRELESS POWER TRANSMISSION DEVICE

(71) Applicant: Youhua Technology (Shenzhen) Co., Ltd, Shenzhen (CN)

(72) Inventors: Shu-Mu Chen, Hsin Chuang (TW); Poh Chia Cheng, Johor (MY)

(73) Assignee: Youhua Technology (Shenzhen) Co., Ltd, Shenzhen (CN)

( * ) Notice: Subject to any disclaimer, the term of this patent is extended or adjusted under 35 U.S.C. 154(b) by 3 days.

(21) Appl. No.: 15/791,435

(22) Filed: Oct. 24, 2017

(65) Prior Publication Data

US 2018/0254663 A1 Sep. 6, 2018

(30) Foreign Application Priority Data

Mar. 2, 2017 (CN) .......................... 2017 1 0120114

(51) Int. Cl.
*H02J 50/10* (2016.01)
*H02J 7/02* (2016.01)
*H04B 5/00* (2006.01)

(52) U.S. Cl.
CPC .............. *H02J 50/10* (2016.02); *H02J 7/025* (2013.01); *H04B 5/0037* (2013.01); *H04B 5/0056* (2013.01); *H04B 5/0081* (2013.01)

(58) Field of Classification Search
CPC .......... H02J 50/10; H02J 7/025; H04B 5/0037
USPC ........................................................ 320/108
See application file for complete search history.

(56) References Cited

U.S. PATENT DOCUMENTS

| 2017/0229911 A1* | 8/2017 | Ettes et al. | H02J 5/005 |
| 2018/0166927 A1* | 6/2018 | Chen et al. | H02J 50/40 |
| 2018/0219419 A1* | 8/2018 | Ettes et al. | H02M 3/3376 |
| 2018/0323648 A1* | 11/2018 | Joye et al. | H02J 50/12 |
| 2018/0342899 A1* | 11/2018 | Joye et al. | H02J 50/80 |
| 2018/0366984 A1* | 12/2018 | Joye et al. | H02J 50/12 |

* cited by examiner

*Primary Examiner* — Sun J Lin

(57) ABSTRACT

A transceiving wireless power transmission device enclosure herein includes a transmitting and receiving coil, a receiving controller, a transmitting controller and a full-bridge switch connected to the transmitting and receiving coil and the receiving controller and the transmitting controller. When the full bridge switch determines that the transmitting and receiving coil is connected to the receiving controller or the transmitting controller. A near field communication (NFC) modulating unit is connected between the transmitting controller and NFC induction coil. The transmitting and receiving coil can optionally transmit or receive a wireless power according to an actual requirement, the NFC modulating circuit can determine whether an NFC circuit is formed on a receiving end of a smart phone or other electrical products. If the NFC circuit is formed on the receiving end, the transmitting controller is notified to activate an NFC protection to ensure that the NFC circuit can't be damaged.

11 Claims, 2 Drawing Sheets

TRANSCEIVING WIRELESS POWER TRANSMISSION DEVICE

BACKGROUND

1. Technical Field

The present disclosure generally relates to wireless powers field, and especially relates to a transceiving wireless power transmission device.

2. Description of Related Art

Wireless power transmission refers to non-contact power transmission between a primary coil (transmitting coil) of a transmitting device and a secondary coil (receiving coil) of a receiving device by using the alternating magnetic fields, with power ranges from a few watts to thousands of watts. Thus, it can avoid the danger of "jumping fire" (or "arcing") of the devices due to the ageing of connection without requiring a physical connector to connect therebetween. In this way, this type of power transmission is greatly convenient to use.

At present, all kinds of wireless power transmission devices, provide a single transmitting circuit and a transmitting coil to form a transmitting base station with wireless power transmission; and provide a single receiving circuit and a receiving coil to form a receiving device with wireless power transmission. The present disclosure firstly designs a coil to meet the technical requirement simultaneously as a transmitting coil and a receiving coil, an integrated receiving and transmitting structure suitable for all wireless power transmission specifications is formed by an intelligent switching circuit.

At present, all kinds of wireless power transmission products, may damage to an NFC circuit (near distance wireless communication technology) formed on a receiving end of a smart phone during the process of wireless power transmission. The present disclosure designs an NFC induction coil positioned after the transmitting and receiving coil thereof, and designs an NFC modulating circuit after the NFC induction coil that is adopted to determine whether an NFC circuit is formed on the receiving end of the smart phone. If an NFC circuit is formed on the receiving end of the smart phone, a transmitting controller is notified to activate an NFC protection to ensure that the NFC circuit in the receiving end can't be damaged.

SUMMARY

The disclosure relates to a transceiving wireless power transmission device which may optionally receive or transmit a wireless electrical energy according to actual requirement.

The object of the present disclosure is to achieve by the following technical proposal:

In one aspect, a transceiving wireless power transmission device includes: a transmitting and receiving coil configured for optionally transmitting or receiving electrical energy, a receiving controller configured for connecting to a load or a transmitting base station, a transmitting controller and a full-bridge switch. One end of the full-bridge switch is connected to the transmitting and receiving coil, and the other two ends are respectively connected to the receiving controller and the transmitting controller, thereby the full-bridge switch may optionally determine the transmitting and receiving coil connected to the receiving controller or the transmitting controller. When the transmitting and receiving coil receives electrical energy, at this time, the full-bridge switch is connected to the receiving controller so that the electrical energy passes through the full-bridge switch and then is transmitted to the receiving controller, finally the electrical energy is transmitted to the load or the transmitting base station. Otherwise, when the electrical energy needs to be transmitted, at this time, the transmitting controller is connected to the full-bridge switch so that the electrical energy passes through the transmitting controller and then is transmitted to the full-bridge switch, thereafter the electrical energy is transmitted to the transmitting and receiving coil from the full-bridge switch, and finally the transmitting and receiving coil transmits the electrical energy out through wireless transmission.

Wherein the receiving controller is connected to a power supply unit for the receiving controller configured for supplying power to the receiving controller, when the full-bridge switch is connected with the receiving controller, the full-bridge switch also supplies power to the power supply not for the receiving controller to enable the electrical energy to meet the work demand of the receiving controller; the transmitting controller is connected to a power supply unit for the transmitting controller configured for receiving an accessed electrical energy and supplying power to the transmitting controller.

Wherein the transceiving wireless power transmission device further includes an NFC modulating unit connected between the transmitting controller and an NFC induction coil; when the electrical energy needs to be transmitted out, the accessed electrical energy is transferred to the NFC modulating unit, and then the NFC modulating unit can activate the NFC induction coil to detect whether an NFC circuit is formed on a wireless transmission receiving end; otherwise, when the NFC circuit is detected in the wireless transmission receiving end, the NFC modulating unit transmits the detection data to the full-bridge switch by the transmitting controller; at this time, the full-bridge switch provides a protection of the NFC circuit on the wireless transmission receiving end by not carrying out the wireless transmission or enabling other protective devices.

Wherein two ends of a DC input end is respectively connected to the transmitting controller and the power supply unit for the transmitting controller, the DC input end transmits a part of DC current to the power supply unit for the transmitting controller to supply power to the transmitting controller; the transmitting controller controls the electrical energy transmitted from the DC input end as the voltage, current, or frequency of the power to meet the needs of the wireless transmission.

Wherein the transceiving wireless power transmission device further includes a battery pack, the receiving controller is connected to the charging input end of the battery pack, and the transmitting controller and the power supply unit for the transmitting controller are respectively connected to the output ends of the battery pack; the wireless electrical energy transmitted to the receiving controller can be transferred to charge the battery pack; when needing to discharge, the battery pack supplies power to the transmitting controller by the power supply unit for the transmitting controller, and then the transmitting controller transmits the electrical energy to the full-bridge switch finally transmitted the electrical energy out by the transmitting and receiving coil.

Wherein the receiving controller is connected to a communicating and modulating unit which is connected to the transmitting base station; the electrical energy is transmitted to the full-bridge switch when the transmitting and receiving coil receives electrical energy; the full-bridge switch transmits a part of the electrical energy after being processed to the power supply unit for the receiving controller for supplying power to the receiving controller; the receiving controller processes the electrical energy directly transmitted from the full-bridge switch and then transmits to the communicating and modulating unit; the communicating and modulating unit can process the electrical energy according to the requirements of the transmitting base station, and the electrical energy after being processed is transmitted out by the transmitting base station.

In another aspect, a transceiving wireless power transmission device for wireless signal transmission includes: a transmitting and receiving coil configured for optionally transmitting or receiving electrical energy, a receiving controller configured for connecting to a load or a transmitting base station, a power supply unit for the receiving controller connected to the receiving controller and configured for supplying power to the receiving controller, a transmitting controller, a power supply unit for the transmitting controller connected to the transmitting controller and configured for receiving an accessed electrical energy and supplying power to the transmitting controller, and a full-bridge switch. One end of the full-bridge switch is connected to the transmitting and receiving coil, and the other two ends are respectively connected to the receiving controller and the transmitting controller, thereby the full-bridge switch may optionally determine the transmitting and receiving coil connected to the receiving controller or the transmitting controller. When the transmitting and receiving coil receives electrical energy, at this time, the full-bridge switch is connected to the receiving controller so that the electrical energy passes through the full-bridge switch and then is transmitted to the receiving controller, finally the electrical energy is transmitted to the load or the transmitting base station; at same time, the full-bridge switch also supplies power to the power supply unit for the receiving controller to enable the electrical energy to meet the work demand of the receiving controller. Otherwise, when the electrical energy needs to be transmitted, at this time, the transmitting controller is connected to the full-bridge switch so that the electrical energy passes through the transmitting controller and then is transmitted to the full-bridge switch, thereafter the electrical energy is transmitted to the transmitting and receiving coil from the full-bridge switch, and finally the transmitting and receiving coil transmits the electrical energy out through wireless transmission; at the same time, the electrical energy is transmitted to the power supply unit for the transmitting controller from the transmitting controller so that the power supply unit for the transmitting controller is configured for supplying power to the transmitting controller.

Wherein the transceiving wireless power transmission device further includes an NFC modulating unit connected between the transmitting controller and an NFC induction coil; when the electrical energy needs to be transmitted out, the accessed electrical energy is transferred to the NFC modulating unit, and then the NFC modulating unit can activate the NFC induction coil to detect whether an NFC circuit is formed on a wireless transmission receiving end; otherwise, when the NFC circuit is detected in the wireless transmission receiving end, the NFC modulating unit transmits the detection data to the full-bridge switch by the transmitting controller; at this time, the full-bridge switch provides a protection of the NFC circuit on the wireless transmission receiving end by not carrying out the wireless transmission or enabling other protective devices.

Wherein two ends of a DC input end is respectively connected to the transmitting controller and the power supply unit for the transmitting controller, the DC input end transmits a part of DC current to the power supply unit for the transmitting controller to supply power to the transmitting controller; the transmitting controller controls the electrical energy transmitted from the DC input end as the voltage, current, or frequency of the power to meet the needs of the wireless transmission.

Wherein the transceiving wireless power transmission device further includes a battery pack, the receiving controller is connected to the charging input end of the battery pack, and the transmitting controller and the power supply unit for the transmitting controller are respectively connected to the output ends of the battery pack; the wireless electrical energy transmitted to the receiving controller can be transferred to charge the battery pack; when needing to discharge, the battery pack supplies power to the transmitting controller by the power supply unit for the transmitting controller, and then the transmitting controller transmits the electrical energy to the full-bridge switch, finally transmitted the electrical energy out by the transmitting and receiving coil.

Wherein the receiving controller is connected to a communicating and modulating unit which is connected to the transmitting base station; the electrical energy is transmitted to the full-bridge switch when the transmitting and receiving coil receives electrical energy; the full-bridge switch transmits a part of the electrical energy after being processed to the power supply unit for the receiving controller for supplying power to the receiving controller; the receiving controller processes the electrical energy directly transmitted from the full-bridge switch and then transmits to the communicating and modulating unit; the communicating and modulating unit can process the electrical energy according to the requirements of the transmitting base station, and the electrical energy after being processed is transmitted out by the transmitting base station.

The present disclosure provides the advantages as below.

The transmitting and receiving coil may optionally transmit or receive the wireless power according to actual requirement, the NFC modulating circuit may determine whether an NFC circuit is formed on a receiving end of a smart phone or other electrical products. If the NFC circuit is formed on the receiving end, the transmitting controller is notified to activate an NFC protection to ensure that the NFC circuit can't be damaged.

Figure 1:
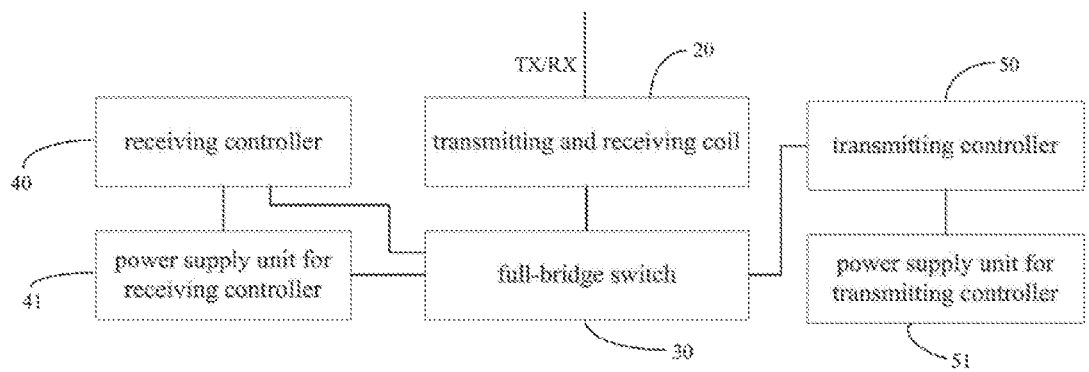
FIG. 1 is a basis circuit schematic view of the transceiving wireless power transmission device in accordance with an exemplary embodiment.

The element labels according to the embodiments of the present disclosure shown as below:

transmitting and receiving coil 20, DC input end 21, full-bridge switch 30, receiving controller 40, battery pack 4050, power supply unit for receiving controller 41, transmitting controller 50, power supply unit for transmitting controller 51, NFC induction coil 60, NFC modulating unit 61, communicating and modulating unit 70, transmitting base station 80, load 90.

DETAILED DESCRIPTION

The disclosure is illustrated by way of example and not by way of limitation in the figures of the accompanying drawings, in which like reference numerals indicate similar elements.

The technical proposal of the present disclosure is further described in detail with the exemplary embodiment below. TX/RX is represented transmitting (TX) or receiving (RX) electrical energy, and NFC is represented near field wireless communication technology. Due to the control effect of the full-bridge switch 30, the transmitting and receiving coil 20 can only connect to the receiving controller 40 or the transmitting controller 50, rather than connect to the receiver controller 40 and the transmitting controller 50 at the same time. That is to say, the transmitting and receiving coil 20 either receives the wireless transmission power, or transmits the wireless transmission power.

Referring to FIG. 1, the circuit diagram of the transceiving wireless power transmission device according to an exemplary embodiment provided. The transceiving wireless power transmission device includes a transmitting and receiving coil 20, a full-bridge 30 (circuit diagram shown in FIG. 6), a receiving controller 40 (circuit diagram shown in FIG. 7), a power supply unit for the receiving controller 41 (circuit diagram shown in FIG. 8), a transmitting controller 50 (circuit diagram shown in FIG. 9) and a power supply unit for the transmitting controller 51 (circuit diagram shown in FIG. 10).

Figure 2:
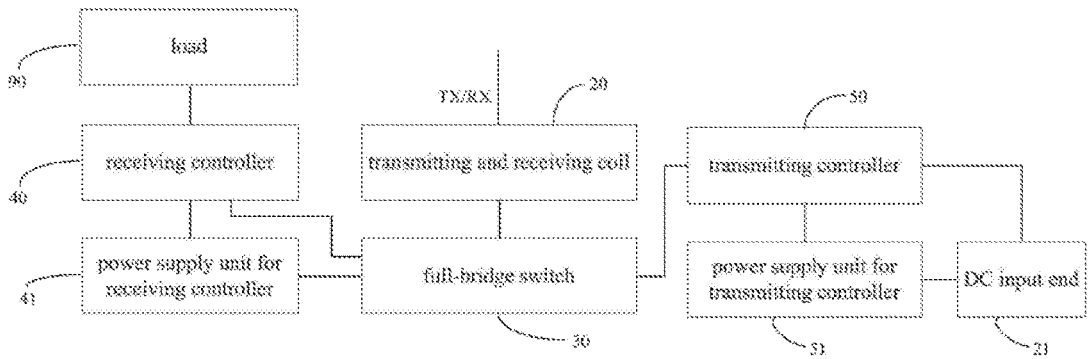
FIG. 2 is a schematic view of the transceiving wireless power transmission device in accordance with a first embodiment.

Referring to FIG. 2, the transceiving wireless power transmission device according to a first exemplary embodiment is provided. In the present embodiment, the receiving controller 40 is connected to a load 90 and configured for supplying working power for the load 90. Two ends of a DC input end 21 is respectively connected to the transmitting controller 50 and the power supply unit for the transmitting controller 51. When the transmitting and receiving coil 20 receives electrical energy, the electrical energy is then transmitted to the full-bridge switch 30. At this time, the full-bridge switch 30 transmits a part of the electrical energy after being processed to the power supply unit for the receiving controller 41 for supplying power to the receiving controller 40, there receiving controller 40 processes the electrical energy directly transmitted from the full-bridge switch 30 and then modulates the electrical energy to meet the work requirements of the load 90.

The DC input end 21 transmits a part of DC current to the power supply unit for the transmitting controller 51 to supply power to the transmitting controller 50. The transmitting controller 50 controls the electrical energy transmitted from the DC input end 21 as the voltage, current, or frequency of the power to meet the needs of the wireless transmission. The transmitting controller 50 processes the electrical energy and then transmits to the full-bridge switch 30, finally transmits the electrical energy out by the transmitting and receiving coil 20.

In the present embodiment, the transceiving wireless power transmission device can supply the wireless electrical energy received to the load 90 and transmit the received direct current out by wireless transmission. Of course, the DC input end 21 of the present embodiment can also add a corresponding AC/DC converter to convert the connected AC current to DC current to meet AC current requirement of the current accessed.

Figure 3:
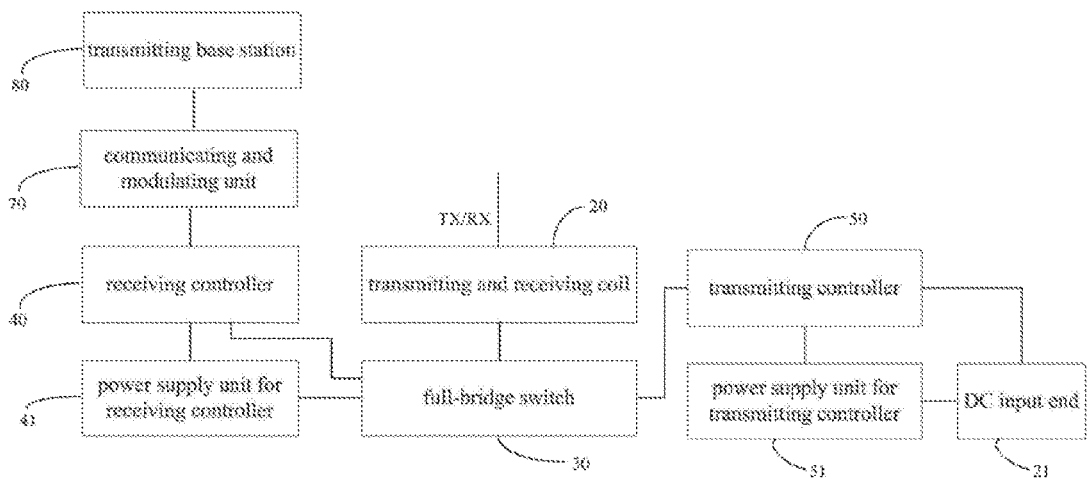
FIG. 3 is a schematic view of the transceiving wireless power transmission device in accordance with a second embodiment.

Referring to FIG. 3, the transceiving wireless power transmission device according to a second exemplary embodiment is provided. In the present embodiment, the receiving controller 40 is connected to a communicating and modulating unit 70 which is connected to a transmitting base station 80. Two ends of a DC input end 21 is respectively connected to the transmitting controller 50 and the power supply unit for the transmitting controller 51. When the transmitting and receiving coil 20 receives electrical energy, the electrical energy is then transmitted to the full-bridge switch 30. At this time, the full-bridge switch 30 transmits a part of the electrical energy after being processed to the power supply unit for the receiving controller 41 for supplying power to the receiving controller 40. The receiving controller 40 processes the electrical energy directly transmitted from the full-bridge switch 30 and then transmits to the communicating and modulating unit 70. The communicating and modulating unit 70 can process the electrical energy according to the requirements of the transmitting base station 80, and the electrical after being processed is transmitted out by the transmitting base station 80.

In addition, the DC input end 21 transmits a part of DC current to the power supply unit for the transmitting controller 51 to supply power to the transmitting controller 50. The transmitting controller 50 controls the electrical energy transmitted from the DC input end 21 as the voltage, current, or frequency of the power to meet the needs of the wireless transmission. The transmitting controller 50 processes the electrical energy and then transmits to the full-bridge switch 30, finally transmits the electrical energy out by the transmitting and receiving coil 20.

In the present embodiment, the transceiving wireless power transmission device can process the wireless electrical energy received and then transmit the wireless electrical energy out by the transmitting base station 80. Of course, the DC input end 21 of the present embodiment can also add a corresponding AC/DC converter to convert the connected AC current to DC current to meet AC current requirement of the current accessed. The structure of the present embodiment can be used as a wireless transmission station for electrical energy to transmit the wireless power out through the transmitting base station 80. Furthermore, the electrical energy specifically accessed can be wirelessly transmitted out through the above device.

Figure 4:
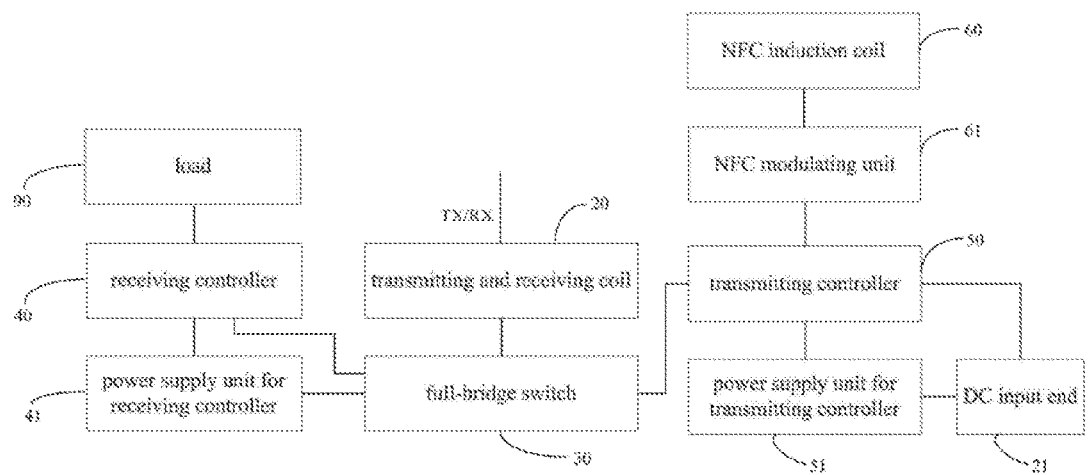
FIG. 4 is a schematic view of the transceiving wireless power transmission device in accordance with a third embodiment.

Referring to FIG. 4, the transceiving wireless power transmission device according to a third exemplary embodiment is provided. The structure of the present embodiment is similar to the second exemplary embodiment. When an NFC circuit is possible formed on a wireless transmission receiving end and transmitted to the transmitting and receiving coil 20, the transceiving wireless power transmission device is needed to connect to an NFC induction coil 60 and an NFC modulating unit 61. In the present embodiment, the NFC modulating unit 61 is connected between the transmitting controller 50 and the NFC induction coil 60. The NFC modulating unit 61 can determine whether an NFC circuit is thrilled on a wireless transmission receiving end by induction of the NFC induction coil 60. When the NFC circuit is detected in the wireless transmission receiving end, the NFC modulating unit 61 may transmit the detection data to the full-bridge switch 30 by the transmitting controller 50, at this time, the full-bridge switch 30 provides a protection of the NFC circuit on the wireless transmission receiving end by not carrying out the wireless transmission or enabling other protective devices.

Figure 5:
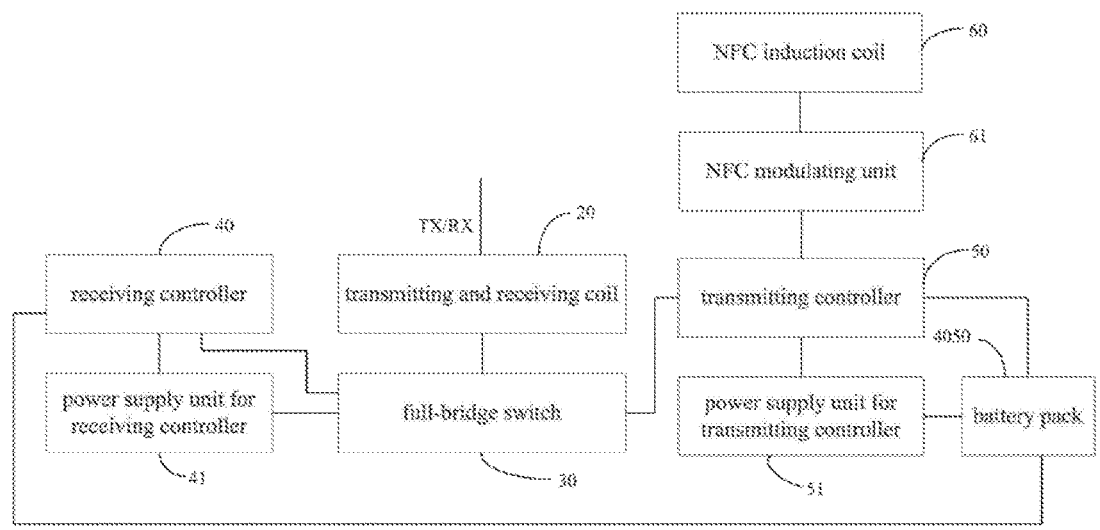
FIG. 5 is a schematic view of the transceiving wireless power transmission device in accordance with a fourth embodiment.

Referring to FIG. 5, the transceiving wireless power transmission device according to a fourth exemplary embodiment is provided. In the present embodiment, based on the basic circuit diagram of FIG. 1, the transceiving wireless power transmission device further includes a battery pack 4050. The receiving controller 40 is connected to the charging input end of the battery pack 4050, and the transmitting controller 50 and the power supply unit for the transmitting controller 51 are respectively connected to the output ends of the battery pack 4050. The wireless electrical energy transmitted to the receiving controller 40 can be transferred to charge the battery pack 4050. When needing to discharge, the battery pack 4050 supplies power to the transmitting controller 50 by the power supply unit for the transmitting controller 51, and then the transmitting controller 50 transmits the electrical energy to the full-bridge switch 30, finally transmits the electrical energy out by the transmitting and receiving coil 20. When an NFC circuit is possible formed on a wireless transmission receiving end and transmitted to the transmitting and receiving coil 20, the transceiving wireless power transmission device is needed to connect to an NFC induction coil 60 and an NFC modulating unit 61. In the present embodiment, the NFC modulating unit 61 is connected between the transmitting controller 50 and the NFC induction coil 60. The NFC modulating unit 61 can determine whether an NFC circuit is formed on a wireless transmission receiving end by induction of the NFC induction coil 60. When the NFC circuit is detected in the wireless transmission receiving end, the NFC modulating unit 61 transmits the detection data to the full-bridge switch 30 by the transmitting controller 50, at this time, the full-bridge switch 30 provides a protection of the NFC circuit on the wireless transmission receiving end by not carrying out the wireless transmission or enabling other protective devices.

For example, the technical proposal of the present disclosure is used as a wireless charging power supplied for mobile phones or other electronic products. The charging of the wireless charging power supply can be realized by the transmitting and receiving coil 20. When needing to wirelessly charge the mobile phone or other electronic products, due to an NFC circuit is possibly existed in the mobile phone or other electronic products, such direct wireless charging method can destroy the NFC circuit, so the full-bridge switch 30 makes a judgment according the judgment signal of the NFC mediation unit 61. The direct wireless charging method can be supplied on the mobile phone or other electronic products when no NFC circuit exists in mobile phones or other electronic products. The transmitting controller 50 controls the full-bridge switch 30 to reduce the transmitting power or to prohibit charging the mobile phone or other electronic products when the NFC circuit exists in the mobile phone or other electronic products.

Although the features and elements of the present disclosure are described as embodiments in particular combinations, each feature or element can be used or in other various combinations within the principles of the present disclosure to the full extent indicated by the broad general meaning of the terms in which the appended claims are expressed.

What is claimed is:

1. A transceiving wireless power transmission device comprising:
    transmitting and receiving coil configured for optionally transmitting or receiving electrical energy;
    a receiving controller configured for connecting to a load or a transmitting base station;
    a transmitting controller;
    a full-bridge switch, one end of the switch connected to the transmitting and receiving coil, other two ends of the full-bridge switch respectively connected to the receiving controller and the transmitting controller, the full bridge switch optionally determining the transmitting and receiving coil connected to the receiving controller or the transmitting controller; and wherein
    when the transmitting and receiving coil receives electrical energy, the full-bridge switch is connected to the receiving controller so that the electrical energy passes through the full-bridge switch and then is transmitted to the receiving controller, finally the electrical energy is transmitted to the load or the transmitting base station;
    otherwise, when the electrical energy needs to he transmitted, the transmitting controller is connected to the full-bridge switch so that the electrical energy passes through the transmitting controller and then is transmitted to the full-bridge switch, thereafter the electrical energy is transmitted to the transmitting and receiving coil from the full-bridge switch, and finally the transmitting and receiving coil transimts the electrical energy out through a wireless transmission.

2. The transceiving wireless power transmission device as claimed in claim 1, wherein the receiving controller is connected to a power supply unit for the receiving controller configured for supplying power to the receiving controller, when the full-bridge switch is connected with the receiving controller, the full-bridge switch also supplies power to the power supply unit for the receiving controller to enable the electrical energy to meet a work demand of the receiving controller; the transmitting controller is connected to a power supply unit for the transmitting controller configured for receiving an accessed electrical energy and supplying power to the transmitting controller.

3. The transceiving wireless power transmission device as claimed in claim 2, wherein the transceiving wireless power transmission device further comprises near field communication (NFC) modulating unit connected between the transmitting controller and an NFC induction coil; when the electrical energy needs to he transmitted out, the accessed electrical energy is transferred to the NFC modulating unit, and then the NFC modulating unit can activate the NFC induction coil to detect whether an NEC circuit is formed on a wireless transmission receiving end; when the NFC circuit is detected in the wireless transmission receiving end, the NFC modulating unit transmits detection data to the full-bridge switch by the transmitting controller; at this time, the full-bridge switch provides a protection of the NFC circuit on the wireless transmission receiving end by not carrying out the wireless transmission or enabling other protective devices.

4. The transceiving wireless power transmission device as claimed in claim 2, wherein two ends of a DC input end is respectively connected to the transmitting controller and the power supply unit for the transmitting controller, the DC input end transmits a part of DC current to the power supply unit for the transmitting controller to supply power to the transmitting controller; the transmitting controller controls the electrical energy transmitted from the DC input end as a voltage, a current, or a frequency of the supplied power to meet needs of the wireless transmission.

5. The transceiving wireless, power transmission device as claimed in claim 2, wherein the transceiving wireless power transmission device further comprises a battery pack, the receiving controller is connected to a charging input end of the battery pack, and the transmitting controller and the power supply unit for the transmitting controller are respectively connected to output ends of the battery pack; a wireless electrical energy transmitted to the receiving controller can be transferred to charge the battery pack; when needing to discharge, the battery pack supplies power to the transmitting controller by the power supply unit for the transmitting controller, and then the transmitting controller transmits the electrical energy to the full-bridge switch, finally the electrical energy is transmitted out by the transmitting and receiving coil.

6. The transceiving wireless power transmission device as claimed in claim 2, wherein the receiving controller is connected to a communicating and modulating unit which is connected to the transmitting base station; the electrical energy is transmitted to the full-bridge switch when the transmitting and receiving coil receives electrical energy; the full-bridge switch transmits a part of the electrical energy after being processed to the power supply unit for the receiving controller for supplying power to the receiving controller; the receiving controller processes the electrical energy directly transmitted from the full-bridge switch and then transmits to the communicating and modulating unit; the communicating and modulating unit can process the electrical energy according to requirements of the transmitting base station, and the electrical energy after being processed is transmitted out by the transmitting base station.

7. A transceiving wireless power transmission device comprising:
  a transmitting and receiving coil configured for optionally transmitting or receiving electrical energy;
  a receiving controller configured for connecting to a load or a transmitting base station;
  a power supply unit for the receiving controller connected to the receiving controller and configured for supplying power to the receiving controller;
  a transmitting controller;
  a power supply unit for the transmitting controller and connected to the transmitting controller and configured for receiving an accessed electrical energy and supplying power to the transmitting controller;
  a full-bridge switch, one end of the full-bridge switch connected to the transmitting and receiving coil, other two ends of the full-bridge switch respectively connected to the receiving controller and the transmitting controller, the full bridge switch optionally determining the transmitting and receiving coil connected to the receiving controller or the transmitting controller; and wherein
  when the transmitting and receiving coil receives electrical energy, the full-bridge switch is connected to the receiving controller so that the electrical energy passes through the full-bridge switch and then is transmitted to the receiving controller, finally the electrical energy is transmitted to the toad or the transmitting base station; the full-bridge switch also supplies power to the power supply unit for the receiving controller to enable the electrical energy to meet a work demand of the receiving controller;
  otherwise, when the electrical energy needs to he transmitted, at this time, the transmitting controller is connected to the full-bridge switch so that the electrical energy passes through the transmitting controller and then is transmitted to the full-bridge switch, thereafter the electrical energy is transmitted to the transmitting and receiving coil from the full-bridge switch, and finally the transmitting and receiving coil transmits the electrical energy out through a wireless transmission; at the same time, the electrical energy is transmitted to the power supply unit for the transmitting controller from the transmitting controller so that the power supply unit for the transmitting controller is configured for supplying power to the transmitting controller.

8. The transceiving wireless power transmission device as claimed in claim 7, wherein the transceiving wireless power transmission device further comprises near field communication (NFC) modulating unit connected between the transmitting controller and an NFC induction coil; when the electrical energy needs to be transmitted out, the accessed electrical energy is transferred to the NFC modulating unit, and then the NFC modulating unit can activate the NFC induction coil to detect whether an NFC circuit is formed on a wireless transmission receiving end; when the NFC circuit is detected in the wireless transmission receiving end, the NFC modulating unit transmits detection data to the full-bridge switch by the transmitting controller; at this time, the full-bridge switch provides a protection of the NFC circuit on the wireless transmission receiving end by not carrying out the wireless transmission or enabling other protective devices.

9. The transceiving wireless power transmission device as claimed in claim 7, wherein two ends of a DC input end is respectively connected to the transmitting controller and the power supply unit for the transmitting controller, the DC input end transmits a part of DC current to the power supply unit for the transmitting controller to supply power to the transmitting controller; the transmitting controller controls the electrical energy transmitted from the DC input end as a voltage, a current, or a frequency of the supplied power to meet needs of the wireless transmission.

10. The transceiving wireless power transmission device as claimed in claim 7, wherein the transceiving wireless power transmission device further comprises a battery pack, the receiving controller is connected to a charging input end of the battery pack, and the transmitting controller and the power supply unit for the transmitting controller are respectively connected to output ends of the battery pack; a wireless electrical energy transmitted to the receiving controller can be transferred to charge the battery pack; when needing to discharge, the battery pack supplies power to the transmitting controller by the power supply unit for the transmitting controller, and then the controller transmits the electrical energy to the full-bridge switch, finally the electrical energy is transmitted out by the transmitting and receiving coil.

11. The transceiving wireless power transmission device as claimed in claim 7, wherein the receiving controller is connected to a communicating and modulating unit which is connected to the transmitting base station; the electrical energy is transmitted to the full-bridge switch when the transmitting and receiving coil receives electrical energy; the full-bridge switch transmits a part of the electrical energy after being processed to the power supply unit for the receiving controller for supplying power to the receiving controller; the receiving controller processes the electrical energy directly transmitted from the full-bridge switch and then transmits to the communicating and modulating unit; the communicating and modulating unit can process the electrical energy according to requirements of the transmitting base station, and the electrical energy after being processed is transmitted out by the transmitting base station.

* * * * *